(12) United States Patent  
Arnold et al.

(10) Patent No.: US 12,041,164 B2
(45) Date of Patent: Jul. 16, 2024

(54) ENCRYPTION KEY HYBRID DEPLOYMENT MANAGEMENT

(71) Applicant: INTERNATIONAL BUSINESS MACHINES CORPORATION, Armonk, NY (US)

(72) Inventors: Isabel Arnold, Holte (DK); Søren Peen, Holte (DK); Troels Nørgaard, Greve (DK); Jakub Karol Jelonek, Sulejowek (PL); Blazej Pawlak, Bydgoszcz (PL); Christopher S. Smith, Holzgerlingen (DE); Nataraj Nagaratnam, Durham, NC (US); Marco Pavone, Ehningen (DE); Leo Moesgaard, Hillerod (DK)

(73) Assignee: International Business Machines Corporation, Armonk, NY (US)

( * ) Notice: Subject to any disclaimer, the term of this patent is extended or adjusted under 35 U.S.C. 154(b) by 399 days.

(21) Appl. No.: 17/447,299

(22) Filed: Sep. 10, 2021

(65) Prior Publication Data

US 2023/0080445 A1    Mar. 16, 2023

(51) Int. Cl.
*H04L 9/08* (2006.01)
*H04L 9/14* (2006.01)

(52) U.S. Cl.
CPC .......... *H04L 9/0861* (2013.01); *H04L 9/0894* (2013.01); *H04L 9/14* (2013.01)

(58) Field of Classification Search
CPC ....... H04L 9/0861; H04L 9/0894; H04L 9/14; H04L 9/088; G06F 21/57; G06F 21/6218; G06F 21/72
See application file for complete search history.

(56) References Cited

U.S. PATENT DOCUMENTS

| 4,607,137 A | 8/1986 | Jansen |
| 7,822,206 B2 | 10/2010 | Birk |
| 8,325,924 B2 | 12/2012 | Acar |
| 8,422,686 B2 | 4/2013 | Cachin |

(Continued)

OTHER PUBLICATIONS

Boyd Greg, Enterprise Key Management Foundation—The Future of Crypto Key Management, 2013. (Year: 2013).*

(Continued)

*Primary Examiner* — Trong H Nguyen
(74) *Attorney, Agent, or Firm* — Schmeiser, Olsen & Watts, LLP; Edward Wixted

(57) ABSTRACT

A system, method, and computer program product for implementing encryption key management is provided. The method includes connecting a hardware device to a keystore agent comprising a system configured to manage one or more keystores holding one or more cryptographic key instances. A key template is configured to define an attribute for generating cryptographic keys. The key template is modified such that the keystore component is added to the key template and instances of associated cryptographic keys are generated. Each instance is installed within the keystore component and associated attributes associated with data for consumption are generated. A key event log defining all events associated with a given key of the associated cryptographic keys with respect to a lifetime of the given key is generated and a repository comprising key templates and associated key data is maintained.

20 Claims, 10 Drawing Sheets

(56) References Cited

U.S. PATENT DOCUMENTS

| | | | |
|---|---|---|---|
| 8,584,216 | B1 | 11/2013 | Allen |
| 9,292,673 | B2 | 3/2016 | Rutkowski |
| 9,634,831 | B2 | 4/2017 | Acar |
| 2009/0077371 | A1* | 3/2009 | Powell .................... H04L 9/083 380/278 |
| 2012/0179918 | A1 | 7/2012 | Haas |
| 2013/0036301 | A1* | 2/2013 | Pelton ................. H04L 9/3263 713/155 |
| 2014/0164776 | A1* | 6/2014 | Hook ................. G06F 21/6218 713/171 |
| 2015/0271157 | A1 | 9/2015 | Ronca |
| 2020/0403784 | A1 | 12/2020 | Rodriguez |

OTHER PUBLICATIONS

Isabel Arnold, Your KEY to success for Pervasive Encryption and Multicloud Key Management, Nov. 1, 2020 (Nov. 1, 2020), pp. 1-47, XP093009943, Retrieved from the Internet: URL:https://conferences.gse.org.uk/2020/presentations/2AW.pdf [retrieved on Dec. 20, 2022] p. 6-p. 40.

Greg Boyd, Enterprise Key Management Foundation—The Future of Crypto Key Management, Feb. 1, 2013 (Feb. 1, 2013), pp. 1-22, XP093009935, Retrieved from the Internet: URL:https://share.confex.com/share/120/webprogram/Handout/Session13177/Share13177_EK MF_20130201.pdf [retrieved on Dec. 20, 2022] p. 4-p. 17.

ISR & WO PCT, Date of Mailing Jan. 4, 2023, Applicant's file reference P202009928PCT01, International application No. PCT/EP2022/075120, International filing date Sep. 9, 2022, 14 pages.

CipherTrust Cloud Key Manager Demonstration; https://www.youtube.com/watch?v=RpiGDC0Bzm0; Jan. 9, 2019; 3 pages.

CipherTrust Cloud Key Manager Installation & Configuration Guide 1.7.1; Document Version 1; Jun. 20, 2020; 189 pages.

FORNETIX; Centralized Cloud Key Management for Multi-Cloud Architectures; Jan. 20, 2021; 6 pages.

Mell, Peter et al.; "The NIST Definition of Cloud Computing;" National Institute of Standards and Technology; Special Publication 800-145; Sep. 2011; 7 pages.

* cited by examiner

ENCRYPTION KEY HYBRID DEPLOYMENT MANAGEMENT

BACKGROUND

The present invention relates generally to a system and method for managing cryptographic keys and in particular to a method and associated system for improving cryptographic and software technology associated with configuring and modifying a key template for installing instances of associated cryptographic keys within one or more keystores; and generating an associated transformation structure that fits with the required interface of a keystore agent controlling multiple keystores. Management and governance of cryptographic entities and associated devices typically requires multiple specialized skillsets (associated with a related infrastructure) and security functions to simultaneously and harmoniously function. Likewise, typical cryptographic key generation processes do not enforce naming conventions and require generated keys to be uploaded to each cloud individually. Therefore, the method and associated system of the present invention is configured to enable a guided orchestration process to simplify an operational complexity and enforce separation of duties during management of cryptographic entities crossing multi cloud boundaries.

SUMMARY

A first aspect of the invention provides a hardware device comprising a processor coupled to a computer-readable memory unit and a cryptographic hardware or software unit, the memory unit comprising instructions that when executed by the processor implements an encryption key management method comprising: connecting, by the processor, the hardware device to at least one keystore agent, wherein the at least one keystore agent comprises a system configured to manage one or more keystores holding one or more cryptographic key instances; configuring, by the processor, a key template to define at least one attribute for generating cryptographic keys; configuring, by the processor, at least one target hardware system to receive the cryptographic keys; modifying, by the processor, the key template such that the at least one keystore component and its associated controlling agent is added to the key template, wherein results of the modifying enable the at least one keystore component agent to receive the cryptographic keys generated via execution processing of the key template, followed by installing the cryptographic keys in keystores defined by the key template; generating, by the processor from the key template, a plurality of instances of associated cryptographic keys; installing, by the processor, an instance of each of the plurality of instances within the at least one keystore component through its associated controlling agent pre-defined by the key template to receive the associated cryptographic keys; generating, by the processor from the key template for each the instance with respect to a key management software application, a transformation structure comprising a key value and associated attributes associated with data for consumption by the at least one keystore agent and associated managed keystores of the one or more keystores; enabling, by the processor, the at least one target hardware system such that the at least one target hardware system is operationally functional; generating, by the processor from the key template for each the instance, a key event log defining all events associated with a given key of the associated cryptographic keys with respect to a lifetime of the given key; and maintaining, by the processor, a repository comprising key templates and associated key data generated by the key templates, wherein the repository comprises a backup repository configured to enable restoration functions associated with connected key stores.

Some embodiments of the invention further provide a hardware device for modifying a policy affecting a key attribute defined by the key template for generating the associated cryptographic keys and deploying modifications to the policy with respect to one of the associated cryptographic keys. Likewise, some embodiments of the invention are configured to add an existing keystore and create a new keystore. Furthermore, some embodiments of the invention are configured to configure the key template with respect to multiple key instances and enable separation of duties functionality enforced during a login function executed with respect to access to sensitive operations or executing a key generation process with respect to the hardware device. These embodiments advantageously provide an effective means for simplifying a burden of managing cryptographic entities across multiple complex topologies.

A second aspect of the invention provides an encryption key management method comprising: connecting, by a processor of a hardware device comprising cryptographic hardware or software unit, the hardware device to at least one keystore agent, wherein the at least one keystore agent comprises a system configured to manage one or more keystores holding one or more cryptographic key instances; configuring, by the processor, a key template to define at least one attribute for generating cryptographic keys; configuring, by the processor, at least one target hardware system to receive the cryptographic keys; modifying, by the processor, the key template such that the at least one keystore component and its associated controlling agent is added to the key template, wherein results of the modifying enable the at least one keystore component agent to receive the cryptographic keys generated via execution processing of the key template, followed by installing the cryptographic keys in keystores defined by the key template; generating, by the processor from the key template, a plurality of instances of associated cryptographic keys; installing, by the processor, an instance of each of the plurality of instances within the at least one keystore component through its associated controlling agent pre-defined by the key template to receive the associated cryptographic keys; generating, by the processor from the key template for each the instance with respect to a key management software application, a transformation structure comprising a key value and associated attributes associated with data for consumption by the at least one keystore agent and associated managed keystores of the one or more keystores; enabling, by the processor, the at least one target hardware system such that the at least one target hardware system is operationally functional; generating, by the processor from the key template for each the instance, a key event log defining all events associated with a given key of the associated cryptographic keys with respect to a lifetime of the given key; and maintaining, by the processor, a repository comprising key templates and associated key data generated by the key templates, wherein the repository comprises a backup repository configured to enable restoration functions associated with connected key stores.

Some embodiments of the invention further provide a process for modifying a policy affecting a key attribute defined by the key template for generating the associated cryptographic keys and deploying modifications to the policy with respect to one of the associated cryptographic keys. Likewise, some embodiments of the invention are configured to add an existing keystore and create a new keystore. Furthermore, some embodiments of the invention are configured to configure the key template with respect to multiple key instances and enable separation of duties functionality enforced during a login function executed with respect to access to sensitive operations or executing a key generation process with respect to the hardware device. These embodiments advantageously provide an effective means for simplifying a burden of managing cryptographic entities across multiple complex topologies.

A third aspect of the invention provides a computer program product, comprising a computer readable hardware storage device storing a computer readable program code, the computer readable program code comprising an algorithm that when executed by a processor of a hardware device comprising a cryptographic hardware or software unit implements an encryption key management method, the method comprising: connecting, by the processor, the hardware device to at least one keystore agent, wherein the at least one keystore agent comprises a system configured to manage one or more keystores holding one or more cryptographic key instances; configuring, by the processor, a key template to define at least one attribute for generating cryptographic keys; configuring, by the processor, at least one target hardware system to receive the cryptographic keys; modifying, by the processor, the key template such that the at least one keystore component and its associated controlling agent is added to the key template, wherein results of the modifying enable the at least one keystore component agent to receive the cryptographic keys generated via execution processing of the key template, followed by installing the cryptographic keys in keystores defined by the key template; generating, by the processor from the key template, a plurality of instances of associated cryptographic keys; installing, by the processor, an instance of each of the plurality of instances within the at least one keystore component through its associated controlling agent pre-defined by the key template to receive the associated cryptographic keys; generating, by the processor from the key template for each the instance with respect to a key management software application, a transformation structure comprising a key value and associated attributes associated with data for consumption by the at least one keystore agent and associated managed keystores of the one or more keystores; enabling, by the processor, the at least one target hardware system such that the at least one target hardware system is operationally functional; generating, by the processor from the key template for each the instance, a key event log defining all events associated with a given key of the associated cryptographic keys with respect to a lifetime of the given key; and maintaining, by the processor, a repository comprising key templates and associated key data generated by the key templates, wherein the repository comprises a backup repository configured to enable restoration functions associated with connected key stores.

Some embodiments of the invention further provide a computer program product for modifying a policy affecting a key attribute defined by the key template for generating the associated cryptographic keys and deploying modifications to the policy with respect to one of the associated cryptographic keys. Likewise, some embodiments of the invention are configured to add an existing keystore and create a new keystore. Furthermore, some embodiments of the invention are configured to configure the key template with respect to multiple key instances and enable separation of duties functionality enforced during a login function executed with respect to access to sensitive operations or executing a key generation process with respect to the hardware device. These embodiments advantageously provide an effective means for simplifying a burden of managing cryptographic entities across multiple complex topologies.

The present invention advantageously provides a simple method and associated system capable of managing cryptographic keys.

BRIEF DESCRIPTION OF THE DRAWINGS

FIG. 5A illustrates a graphical user interface associated with key storage, in accordance with embodiments of the present invention.

FIG. 5B illustrates a graphical user interface associated with key placement across multiple cloud systems, in accordance with embodiments of the present invention.

DETAILED DESCRIPTION

Figure 1:
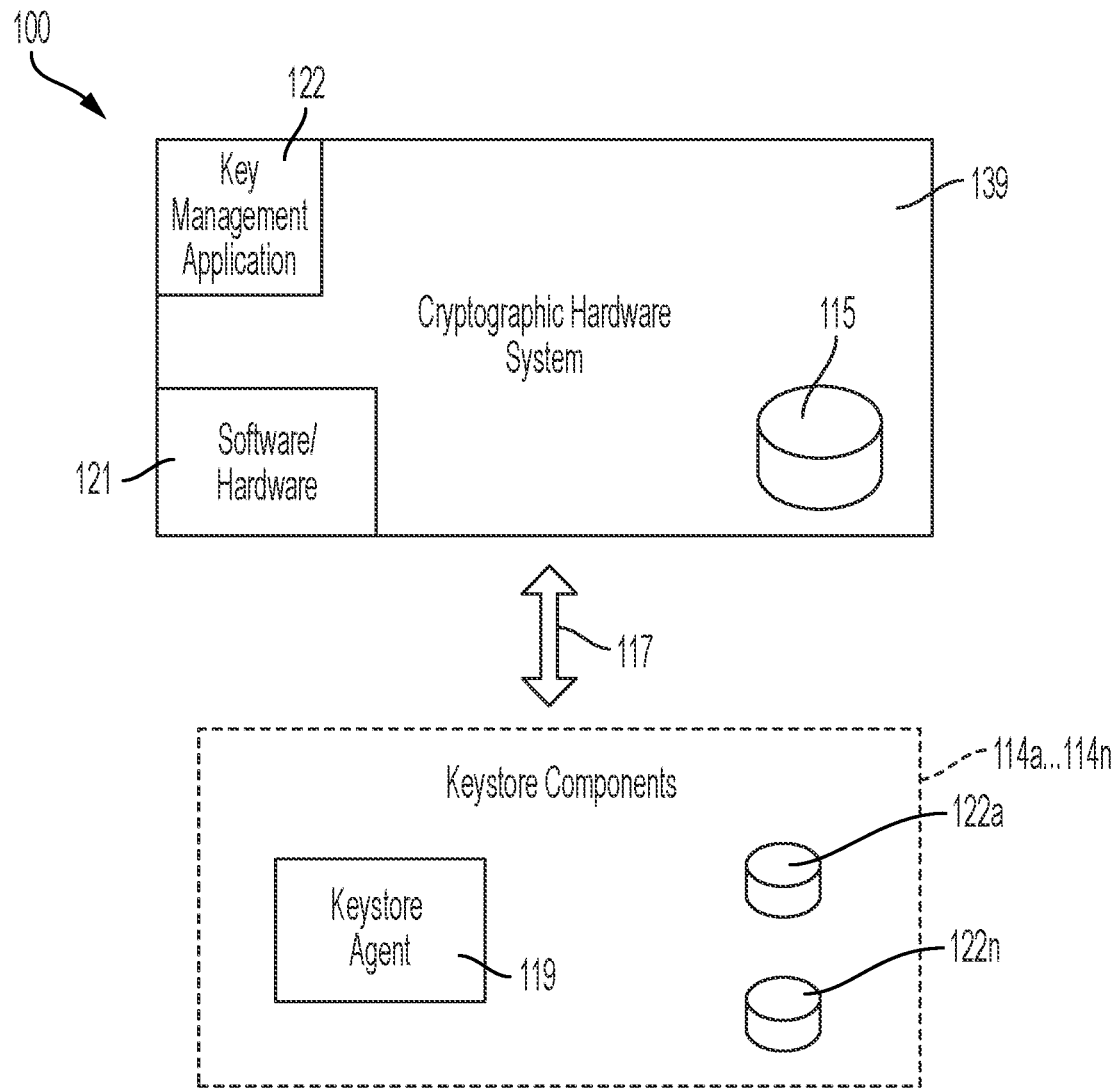
FIG. 1 illustrates a system for improving cryptographic and software technology associated with configuring and modifying a key template for installing instances of associated cryptographic keys within a keystore and generating an associated transformation structure for causing the associated cryptographic keys to be enabled and usable for applications on a target platform, in accordance with embodiments of the present invention.

FIG. 1 illustrates a system 100 for improving cryptographic and software technology associated with configuring and modifying a key template for installing instances of associated cryptographic keys within a keystore and generating an associated transformation structure for causing the associated cryptographic keys to be enabled and usable for applications on a target platform, in accordance with embodiments of the present invention. Management processes associated with cryptographic entities and associated devices typically require multiple specialized skillsets (associated with a related infrastructure) and security functions for enabling functionality. Likewise, typical cryptographic key generation processes are not capable of enforcing naming conventions and require generated keys to be uploaded to each cloud individually. Therefore system 100 is configured to enable key management solutions within a large organization via usage of a template concept such that templates are applied to operations with respect to cryptographic keys to ensure consistency and compliance with client and industry standards. Likewise, system 100 (i.e., the implemented template system) enables governance of client naming conventions as well as policies associated with cryptographic algorithm use and associated key sizes. Additionally, system 100 is configured to generate key stores for enabling an abstraction from differing implementations of endpoints for cryptographic keys thereby reducing a requirement for specialist knowledge for each endpoint for the purpose of key management.

System 100 enables long-term governance and orchestration of cryptographic keys across a diverse infrastructure while alleviating a burden of detecting and maintaining detailed changes within each supported cryptographic endpoint.

System 100 enables a key management process as follows:

The process initiates when a key management system (e.g., system 100 of FIG. 1) is initialized. In response, key stores are defined within the key management system and a target key store is enrolled resulting in a connected key store that is configured to be managed in real-time. Subsequently, a key template is defined with respect to policies and associated metadata. Defining the key template includes defining target key stores as groups or single units. Likewise, a key is generated via usage of a key template (guided by key generation wizard software) receiving supplemental metadata that is not located within the key template. The metadata is mandatory for completion of a key generation process resulting in a generated key distributed to defined key stores. The inputted metadata may include wrappings and transformations required by a receiving system and defined within the key template. Additionally, a process is executed for controlling administration of a key by updating metadata, adding more key stores or removing key stores from set of target key stores for an associated key, backing up a key, restoring a key, deleting a key, and/or supporting key states defined by an authority. The control process is configured to audit, investigate key management operation audit logs, and investigate key management operation key event logs. Likewise, users are enrolled into groups thereby ensuring that dual controls are in place.

System 100 further enables the following functionality:
1. Generating multiple instances of a same key such that a generated key is configured to be enabled via multiple endpoints requiring an associated key value to be wrapped and formatted in a specific way.
2. Aligning key stores such that if a policy (e.g., a template) is modified then the modification is deployed automatically to all target key stores. Additionally, if a new key store is added to an associated key zone, then associated alignment capability is configured to install keys defined by policies.
3. Supporting key hierarchies such that key templates are used to define where a key is to be located (e.g., may be located at more than one location) within a hierarchy.

System 100 of FIG. 1 includes a cryptographic hardware system 139 and keystore components 114*a* . . . 114*n* interconnected through a network 117. Cryptographic hardware system 139 comprises a key management application 122, a database 115, and software/hardware 121. Keystore components 114*a* . . . 114*n* comprise a key store agent 119 and managed keystores 122*a* . . . 122*n* for receiving key instances and metadata installed in the managed keystores 122*a* . . . 122*n* s. Cryptographic hardware system 139 and keystore components 114*a* . . . 114*n* each may comprise an embedded device(s). An embedded device is defined herein as a dedicated device or computer comprising a combination of computer hardware and software (fixed in capability or programmable) specifically designed for executing a specialized function. Programmable embedded computers or devices may comprise specialized programming interfaces. In one embodiment, cryptographic hardware system 139 and keystore components 114*a* . . . 114*n* may each comprise a specialized hardware device comprising specialized (non-generic) hardware and circuitry (i.e., specialized discrete non-generic analog, digital, and logic-based circuitry) for (independently or in combination) executing a process described with respect to FIGS. 1-10. The specialized discrete non-generic analog, digital, and logic-based circuitry (e.g., key management application 122, keystore agent, and software/hardware 121, etc.) may include proprietary specially designed components (e.g., a specialized integrated circuit, such as for example an Application Specific Integrated Circuit (ASIC) designed for only implementing an automated process for improving cryptographic and software technology associated with configuring and modifying a key template for installing instances of associated cryptographic keys within a keystore and generating an associated transformation structure for causing the associated cryptographic keys to be enabled and usable for applications on the target platform. Network 117 may include any type of network including, inter alia, a local area network, (LAN), a wide area network (WAN), the Internet, a wireless network, etc.

System 100 is enabled to execute a process for provisioning cryptographic keys across diverse computing infrastructure as follows:

The process is initiated when a key management application 122 is connected to keystore agent 119 with associated keystores 122*a* . . . 122*n* capable of receiving cryptographic keys that may be used by applications on a target platform. In response, a key template (defining one or more attributes for generating the cryptographic keys) is configured. The key template may include a cryptographic algorithm, a naming convention, a key type, a key size, and restrictions associated with a means for key generation, etc. For example, a key template may be associated with a multiple portion key entry, an import based key entry wrapped with another key, a random generation process associated with a specific scheme, restrictions associated with a key transformation process such as a multiple key wrap process, restrictions associated with key exports, etc. Subsequently, each of the keystores are added to the key template. Likewise, a plurality of instances of a same set of cryptographic keys are generated from the key template. Additionally, an instance for the each of the cryptographic keys are installed within keystores pre-defined by the key template to receive the cryptographic keys. The process further includes generating (from the key template for each key instance) a wrapping or transformation of a key value and associated attributes conforming consumption by the keystore or appliance receiving a key and associated metadata. One or more policies of the key template may be modified thereby affecting attributes defined by the key template for generating the cryptographic keys. Likewise, changes to the one or more policies may be automatically deployed to cryptographic keys previously generated by the key template and stored by the keystores. A new keystore may be added to the key template and the new key store may be aligned automatically with existing keystores by installing all previously generated cryptographic keys executing the key template with respect to the new keystore. Furthermore, the alignment process may be enabled for verifying all attributes required by a policy setting. Therefore, if a key is determined to be accidently missing or comprising incorrect metadata it will be automatically restored or updated. A key template may be configured with multiple key instances such that each key instance is defined to reside at a specific location within the overall key hierarchy. The key hierarchy may include multiple hierarchies designed to enable multiple purposes. For example, a hierarchy retaining a backup of all keys belonging to a specific technology area or a hierarchy enabled for retaining all system keys grouped together. Therefore, a specific key comprising a unique key value may be placed within multiple key hierarchies wrapped with an underlying key within a given hierarchy.

The following implementation example describes a key usage scenario associated with a key designated as a key encryption key associated with exchanging PIN keys with an automated teller machine (ATM). The key is generated as four key instances. A first key instance is associated with a general backup hierarchy with respect to control of a disaster recovery key. A second key instance is placed within a keystore of a host system and is wrapped with a hardware security module (HSM) master key. A third key instance is placed within a host table controlling a set of keys implemented with respect to a specific ATM. A fourth key instance is transmitted to the ATM and is placed within its encrypting pin pad and wrapped with the ATMs master key.

System 100 is further configured to enforce separation of duties functionality enforced during a login function to system 100. The separation of duties functionality is enabled when obtaining access to sensitive operations occurring during a key generation process. Each key record produced from a key template includes its own key event log retaining information associated with a key from its creation to deletion. For example, a first user logged into system 100 and associated with a first generated key portion is currently blocked from generating a second key portion. Likewise, a second user performs a login function and is verified with respect to a key event log to determine if the second user comprises a differing user (with respect to the first user) before the second key portion generation is authorized.

Key stores may include key stores enabled via on premises HSMs or emulating software or key stores in cloud environments such that HSMs and software key stores/key vaults comprising multiple terminologies are used for storage of keys and management by a client. Key management terminology includes BringYourOwn Key (BYOK), KeepYourOwnKey (KYOK), a cloud vendor system offering cryptographic services and a key management interface, etc.

System 100 is enabled to be transparent and supports a heterogeneous world formed by different vendors with specified terminology and hardware/software implementations including differing key wrapping methods and exchange protocols. System 100 supports many key template implementations and a key (unique key value) may be generated and installed within multiple differing target systems via one work process.

System 100 is further enabled to execute a process for implementing a keystore as an abstraction of any system or appliance capable of receiving and using cryptographic keys such as a cloud keystore or an on-premise HSM. Once connected to system 100, key templates may be configured to work with selected keystores thereby allowing a user to create and manage keys for individual or groups of key stores.

Figure 2:
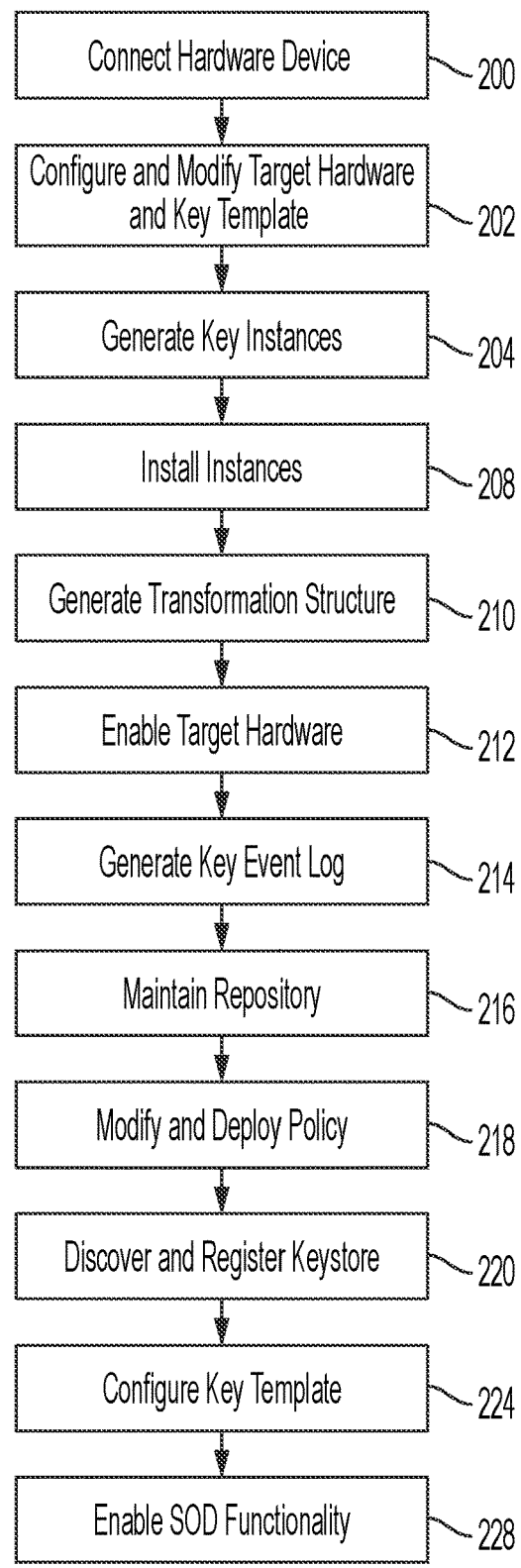
FIG. 2 illustrates an algorithm detailing a process flow enabled by the system of FIG. 1 for improving cryptographic and software technology associated with configuring and modifying a key template for installing instances of associated cryptographic keys within a keystore and generating an associated transformation structure for causing the associated cryptographic keys to be enabled and usable for applications on a target platform, in accordance with embodiments of the present invention.

FIG. 2 illustrates an algorithm detailing a process flow enabled by system 100 of FIG. 1 for improving cryptographic and software technology associated with configuring and modifying a key template for installing instances of associated cryptographic keys within a keystore and generating an associated transformation structure for causing the associated cryptographic keys to be enabled and usable for applications on a target platform, in accordance with embodiments of the present invention. Each of the steps in the algorithm of FIG. 2 may be enabled and executed in any order by a computer processor(s) executing computer code. Additionally, each of the steps in the algorithm of FIG. 2 may be enabled and executed in combination by hardware device 139 and keystore components 114a . . . 114n. In step 200, a hardware device is connected to at least one keystore agent. The at least one keystore agent includes a system configured to manage one or more keystores holding one or more cryptographic key instances. The at least one keystore agent includes a component enabled via the at least one keystore component agent and a hardware security component, an emulating software component, a cloud based key store or key vault, etc. The process for configuring and modifying a key template may include a transparent process associated with differing entities and differing hardware and software based key wrapping processes and exchange protocols.

In step 202, a key template is configured to define at least one attribute for generating cryptographic keys. Likewise, at least one target hardware system is configured to receive the cryptographic keys. Subsequently, the key template is modified such that the at least one keystore agent is added to the key template. Results of the modification may enable the at least one keystore agent to receive the cryptographic keys generated via processing of the key template. Storage of the cryptographic keys may be enabled by, inter alia, a BringYourOwn Key (BYOK) process, a KeepYourOwnKey (KYOK) process, a cloud vendor system offering cryptographic services and a key management interface, etc.

In step 204, plurality of instances of associated cryptographic keys are generated from the key template. In step 208, an instance (of each of the plurality of instances) is installed, under control of a keystore agent, within the at least one keystore pre-defined by the key template to receive the associated cryptographic keys. Installing the instance of each of the plurality of instances may include installing the instance within differing target systems via a single work process with respect to a hybrid environment comprising different cloud systems and on-premise systems enabling several systems to share the given key.

In step 210, a transformation structure is generated from the key template for each instance with respect to a key management software application. The transformation structure includes a key value and associated attributes associated with data for consumption by the at least one keystore agent and associated managed keystores of said one or more keystores. The associated attributes may include, inter alia, a cryptographic algorithm, a specified naming convention, a key type, a key size, and associated restrictions defining key generation with respect to single or multiple key generation means, restrictions defining key export attributes associated with multiple key wrapping attributes or clear key value attributes associated with a number of key parts. The key management application is deployed with respect to, inter alia, a key management workstation, a web application, and a cloud application, etc.

In step 212, the transformation structure may be built such that the hardware device is operationally functional. In step 214, a key event log is generated from the key template for each instance. The key event log defines all events associated with a given key of the associated cryptographic keys with respect to a lifetime of the given key.

In step 216, a repository comprising key templates and associated key data generated by key templates in maintained. The repository comprises a backup repository configured to enable restoration functions associated with connected key stores. In step 218, at least one policy setting affecting at least one key attribute defined by the key template is modified for generating the associated cryptographic keys. Likewise, modifications to the at least one policy setting are deployed with respect to at least one of the associated cryptographic keys previously generated by the key template and stored by the at least one keystore agent configured to receive cryptographic keys generated using the key template. The policy setting may include executable code for automatically restoring a cryptographic key of the associated cryptographic keys if the cryptographic key is missing metadata. Alternatively, the policy setting may include executable code for automatically restoring a cryptographic key of the associated cryptographic keys if the cryptographic key comprises invalid or incorrect metadata.

In step 220, at least one existing key store or key vault is discovered and added via execution of the at least one key store agent. The at least one existing key store or key vault is imported into an associated key management application for enabling availability with respect to inclusion within associated key templates. In response, at least one new key store or key vault is created by the at least one key store agent. Subsequently, the least one new key store or key vault is registered within said associated key management application for availability with respect to inclusion within the key templates. In step 224, the key template is configured with respect to multiple key instances. Each instance of the multiple key instances is defined to reside at a specific location within an overall key hierarchy comprising multiple hierarchies configured to perform multiple functions. The multiple functions may include, inter alia, a hierarchy function retaining a backup of all keys belonging to a specific functional operation, a hierarchy function retaining all system keys grouped together such that a specified key comprising a unique key value may be placed within multiple hierarchies wrapped with an underlying key within a given hierarchy, etc.

In step 228, separation of duties functionality is enabled. The separation of duties functionality is enforced during a login function executed with respect to access to sensitive operations or executing a key generation process with respect to the hardware device. Each key record generated from an associated key template comprises a key event log retaining information associated with a generated key from creation of the generated key to deletion of the generated key thereby covering an associated key lifecycle.

Figure 3:
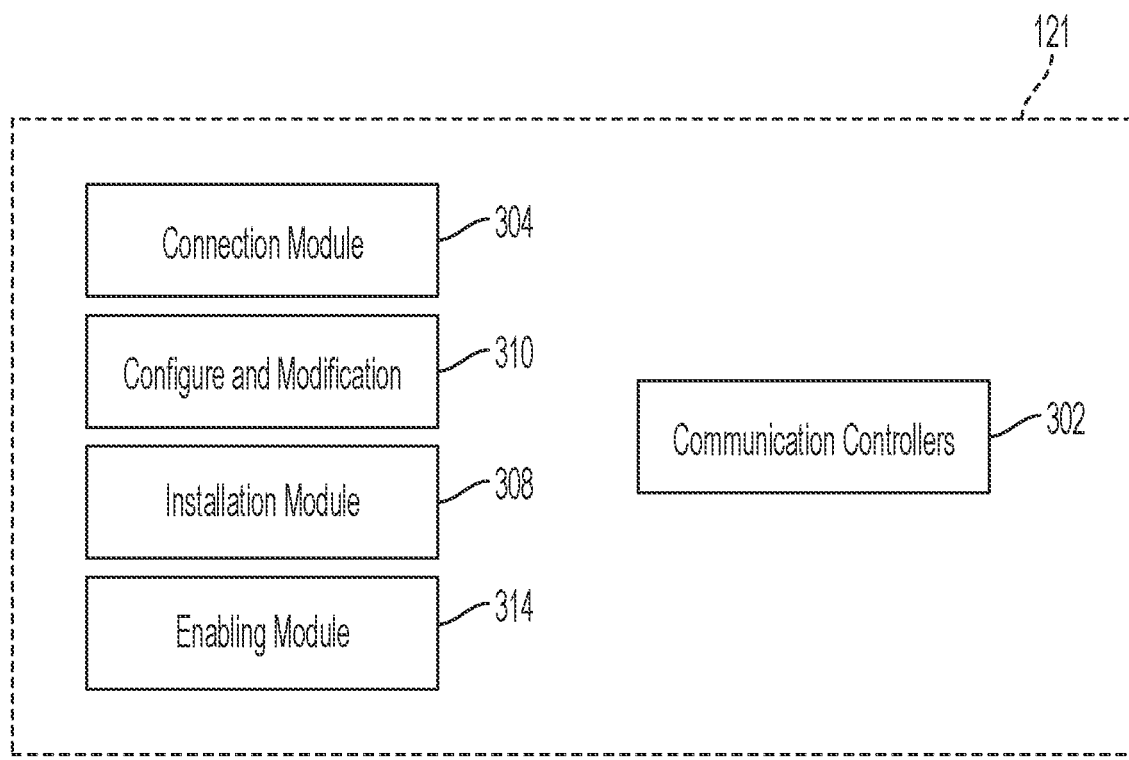
FIG. 3 illustrates an internal structural view of the software/hardware of FIG. 1, in accordance with embodiments of the present invention.

FIG. 3 illustrates an internal structural view of software/hardware 121 of FIG. 1, in accordance with embodiments of the present invention. Software/hardware 121 includes a connection module 304, a configure and modification module 310, an installation (and deployment) module 308, an enabling module 314, and communication controllers 302. Connection module 304 comprises specialized hardware and software for controlling all functions related to the connection steps of FIG. 2. Configure and modification module 310 comprises specialized hardware and software for controlling all functionality related to the configuration and modification steps described with respect to the algorithm of FIG. 2. Installation module 308 comprises specialized hardware and software for controlling all functions related to the installation and deployment steps of FIG. 2. Enabling module 314 comprises specialized hardware and software for controlling all functions related to the enabling steps of the algorithm of FIG. 2. Communication controllers 302 are enabled for controlling all communications between connection module 304, configure and modification module 310, installation module 308, and an enabling module 314.

Figure 4:
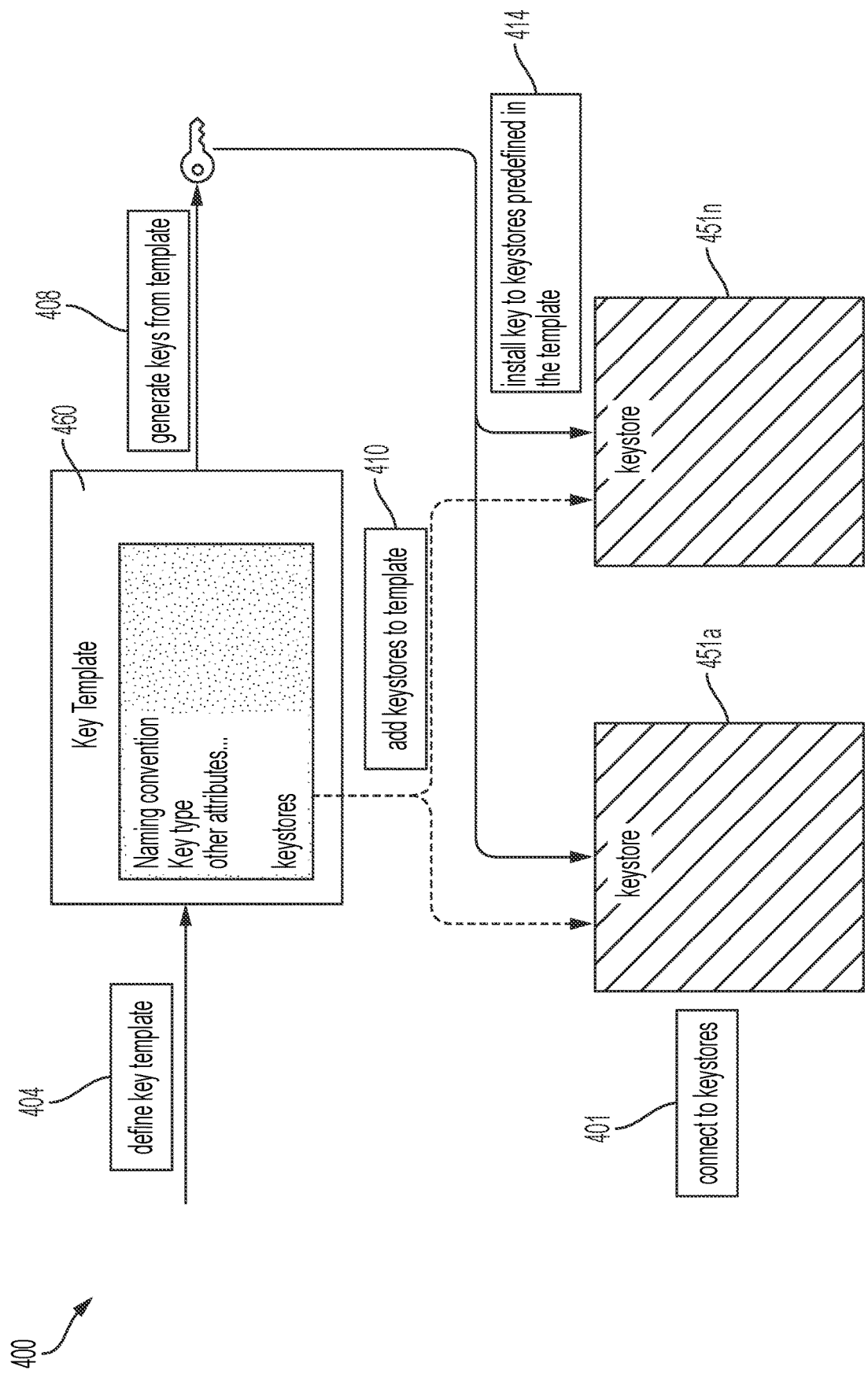
FIG. 4 illustrates a cryptographic key management process enabled by the system of FIG. 1, in accordance with embodiments of the present invention.

FIG. 4 illustrates a cryptographic key management process 400 enabled by system 100 of FIG. 1, in accordance with embodiments of the present invention. The process is initiated in step 401 when a key management system is securely initialized and connected to keystores 451a . . . 451n. Additionally, a process for securely enrolling users and initializing access controls is enabled. Subsequently, key stores are defined and enrolled within the key management system resulting in connected keystores that may be managed in real-time. In step 404, key templates are defined with respect to policies and metadata. The definition process may include defining target keystores as groups or single units and adding the target keystore to a key template 460 in step 410. In step 408, a key is generated via usage of the key template 460 guided via execution of a key generation wizard thereby supplementing with required meta data for completion of a key generation. The key generation process results in a key generated and distributed to defined key stores (in step 414) including wrappings and transformations required by a receiving system and defined in the key template.

Figure 5A:
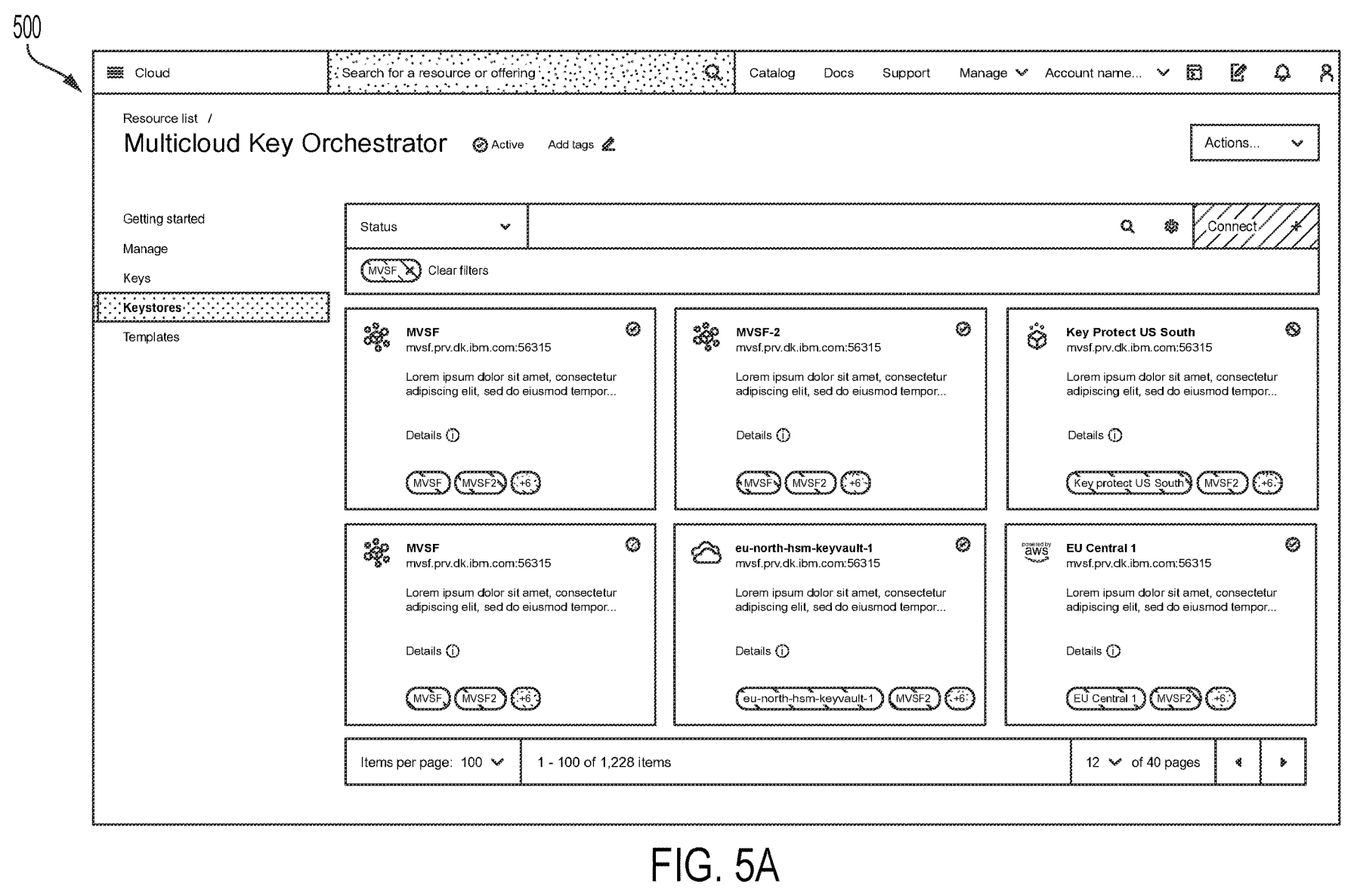

FIG. 5A illustrates a graphical user interface (GUI) 500 associated with key storage, in accordance with embodiments of the present invention. GUI 500 illustrates a multi-cloud key orchestrator control for connecting to keystores and allocating keys.

Figure 5B:
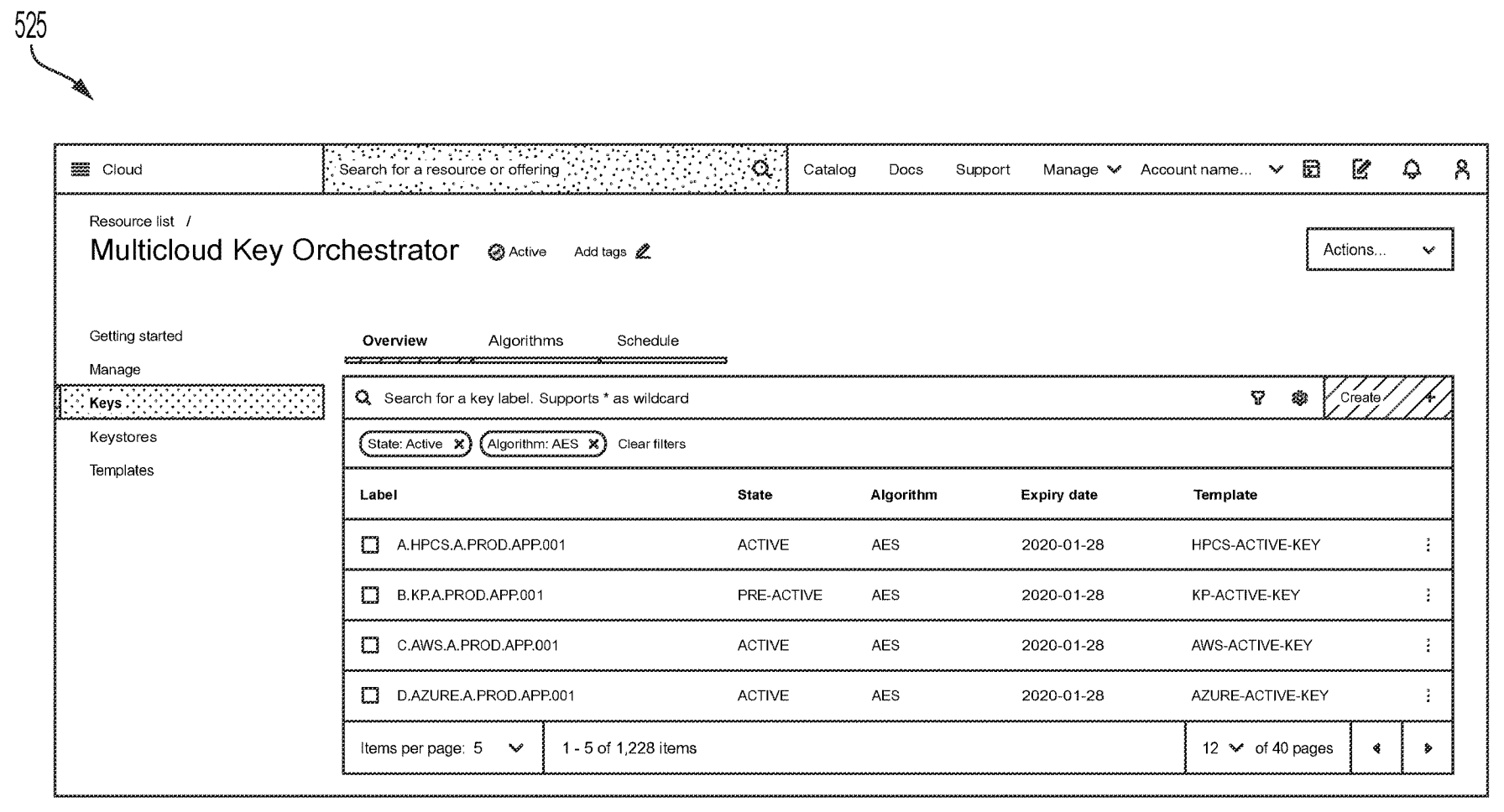

FIG. 5B illustrates a graphical user interface (GUI) 525 associated with key placement across multiple cloud systems, in accordance with embodiments of the present invention. GUI 525 illustrates a key administration process associated with updating metadata and key states and performing backup and restoration of keys.

Figure 5C:
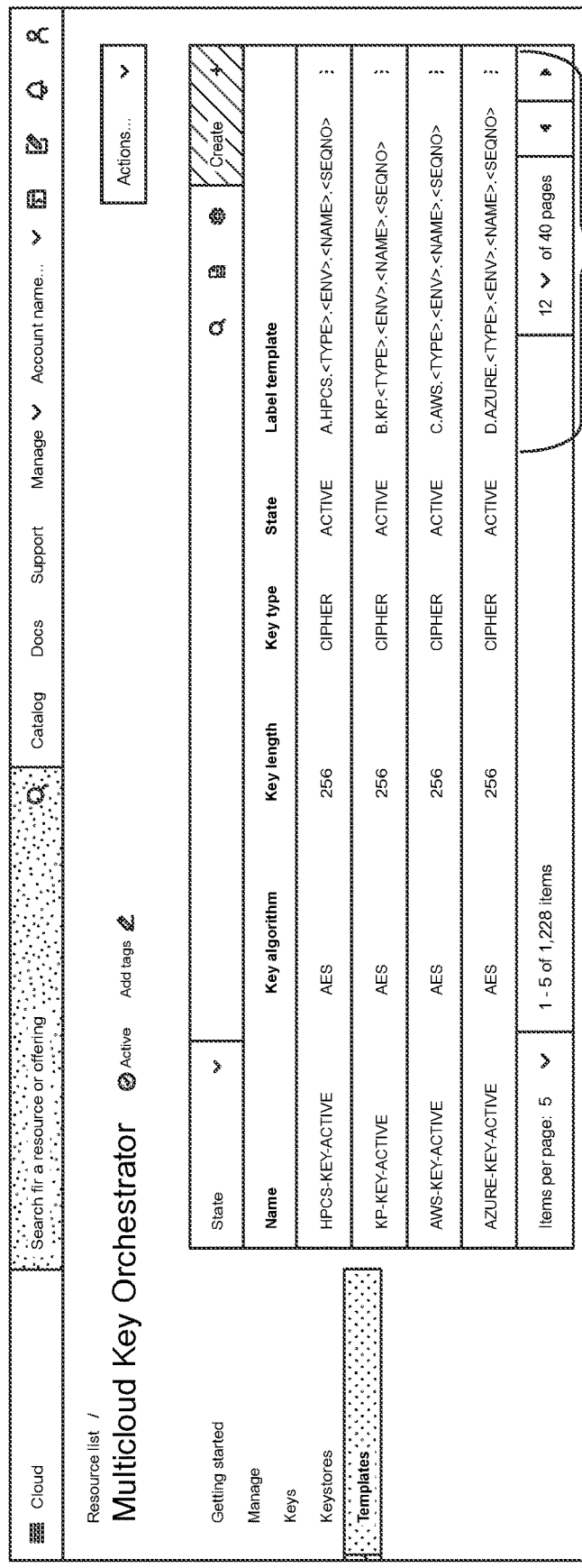
FIG. 5C illustrates a graphical user interface associated with key template administration, in accordance with embodiments of the present invention.

FIG. 5C illustrates a graphical user interface (GUI) 556 associated with key template administration, in accordance with embodiments of the present invention. Key template administration is enabled by updating metadata and adding or removing key stores from the set of target key stores for an associated key.

Figure 6:
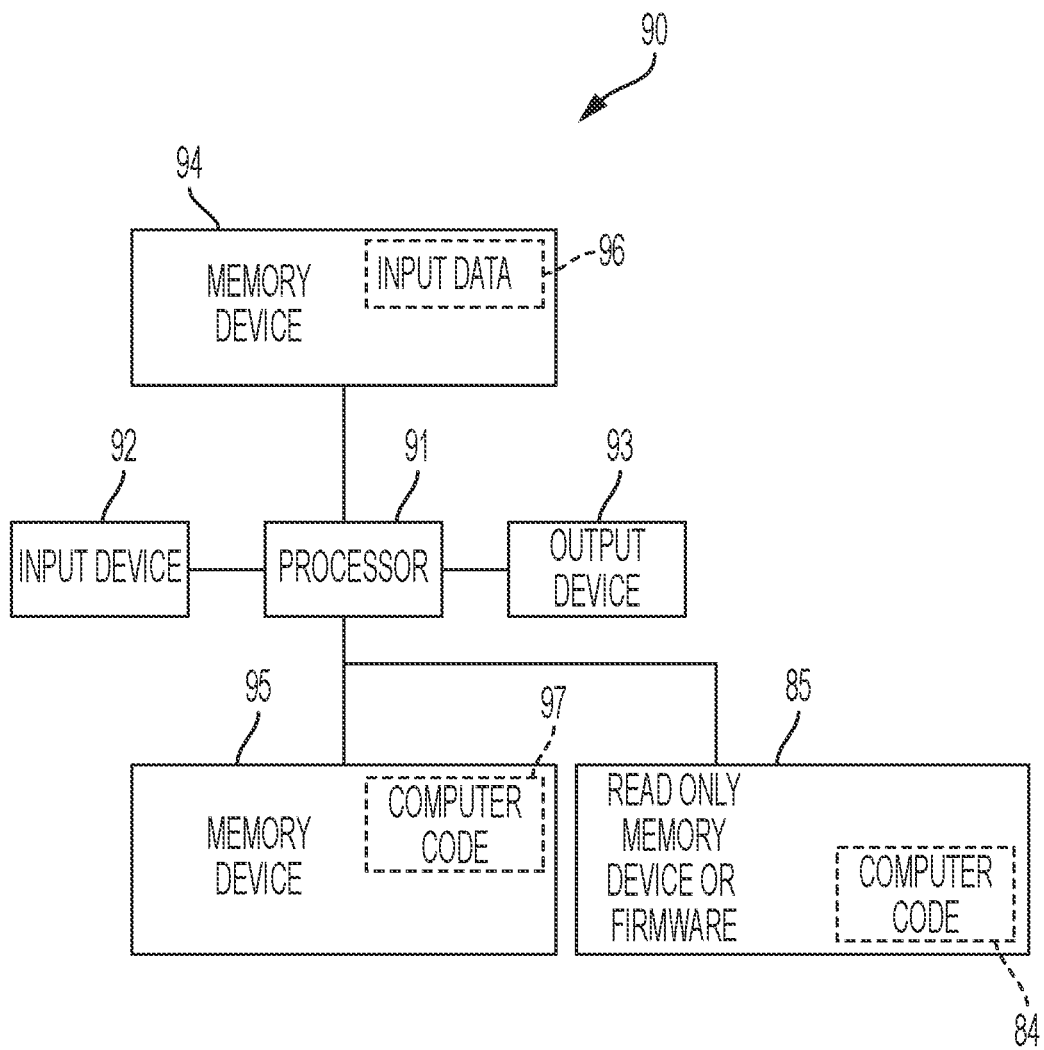
FIG. 6 illustrates a computer system used by the system of FIG. 1 for improving cryptographic and software technology associated with configuring and modifying a key template for installing instances of associated cryptographic keys within a keystore and generating an associated transformation structure for causing the associated cryptographic keys to be enabled and usable for applications on a target platform, in accordance with embodiments of the present invention.

FIG. 6 illustrates a computer system 90 (e.g., a cryptographic hardware system 139 and keystore components 114a . . . 114n of FIG. 1) used by or comprised by the system 100 of FIG. 1 for improving cryptographic and software technology associated with configuring and modifying a key template for installing instances of associated cryptographic keys within a keystore and generating an associated transformation structure for causing the associated cryptographic keys to be enabled and usable for applications on a target platform, in accordance with embodiments of the present invention.

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, spark, R language, or the like, and conventional procedural programming languages, such as the "C" programming language or similar programming languages. The computer readable program instructions may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, device (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing device to produce a machine, such that the instructions, which execute via the processor of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing device, or other device to cause a series of operational steps to be performed on the computer, other programmable device or other device to produce a computer implemented process, such that the instructions which execute on the computer, other programmable device, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 6 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithm of FIG. 2) for improving cryptographic and software technology associated with configuring and modifying a key template for installing instances of associated cryptographic keys within a keystore and generating an associated transformation structure for causing the associated cryptographic keys to be enabled and usable for applications on a target platform. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices Such as read only memory device 96) may include algorithms (e.g., the algorithm of FIG. 2) and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 84 (e.g., including algorithms) may be stored on a static, nonremovable, read-only storage medium such as a Read-Only Memory (ROM) device 85, or may be accessed by processor 91 directly from such a static, nonremovable, read-only medium 85. Similarly, in some embodiments, stored computer program code 97 may be stored as computer-readable firmware 85, or may be accessed by processor 91 directly from such firmware 85, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to improve cryptographic and software technology associated with configuring and modifying a key template for installing instances of associated cryptographic keys within a keystore and generating an associated transformation structure for causing the associated cryptographic keys to be enabled and usable for applications on a target platform. Thus, the present invention discloses a process for deploying, creating, integrating, hosting, maintaining, and/or integrating computing infrastructure, including integrating computer-readable code into the computer system 90, wherein the code in combination with the computer system 90 is capable of performing a method for enabling a process improving cryptographic and software technology associated with configuring and modifying a key template for installing instances of associated cryptographic keys within a keystore and generating an associated transformation structure for causing the associated cryptographic keys to be enabled and usable for applications on a target platform. In another embodiment, the invention provides a business method that performs the process steps of the invention on a subscription, advertising, and/or fee basis. That is, a service supplier, such as a Solution Integrator, could offer to enable a process for improving cryptographic and software technology associated with configuring and modifying a key template for installing instances of associated cryptographic keys within a keystore and generating an associated transformation structure for causing the associated cryptographic keys to be enabled and usable for applications on a target platform. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 6 shows the computer system 90 as a particular configuration of hardware and software, any configuration of hardware and software, as would be known to a person of ordinary skill in the art, may be utilized for the purposes stated supra in conjunction with the particular computer system 90 of FIG. 6. For example, the memory devices 94 and 95 may be portions of a single memory device rather than separate memory devices.

Cloud Computing Environment

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
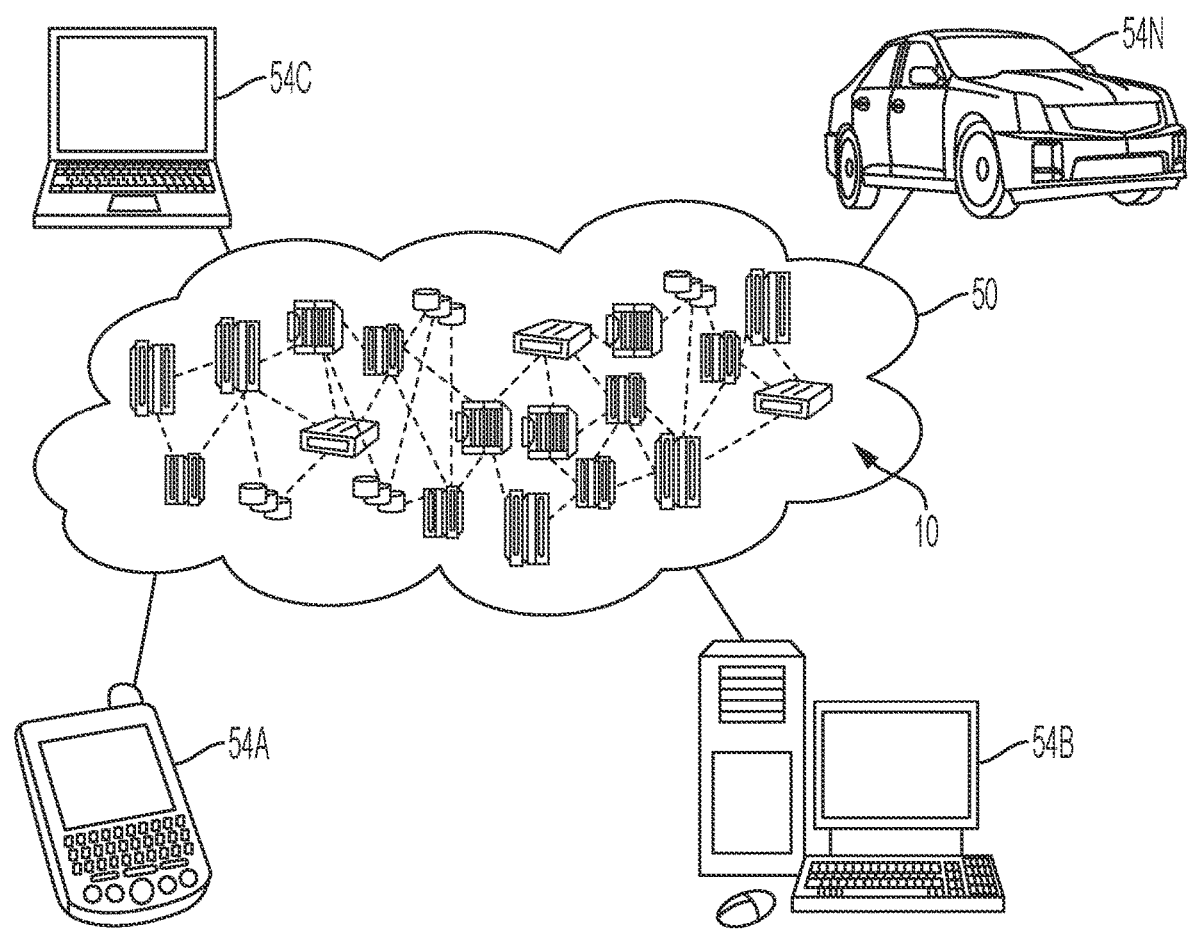
FIG. 7 illustrates a cloud computing environment, in accordance with embodiments of the present invention.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 12 are intended to be illustrative only and that computing nodes 10 and cloud computing environment 50 can communicate with any type of computerized device over any type of network and/or network addressable connection (e.g., using a web browser).

Figure 8:
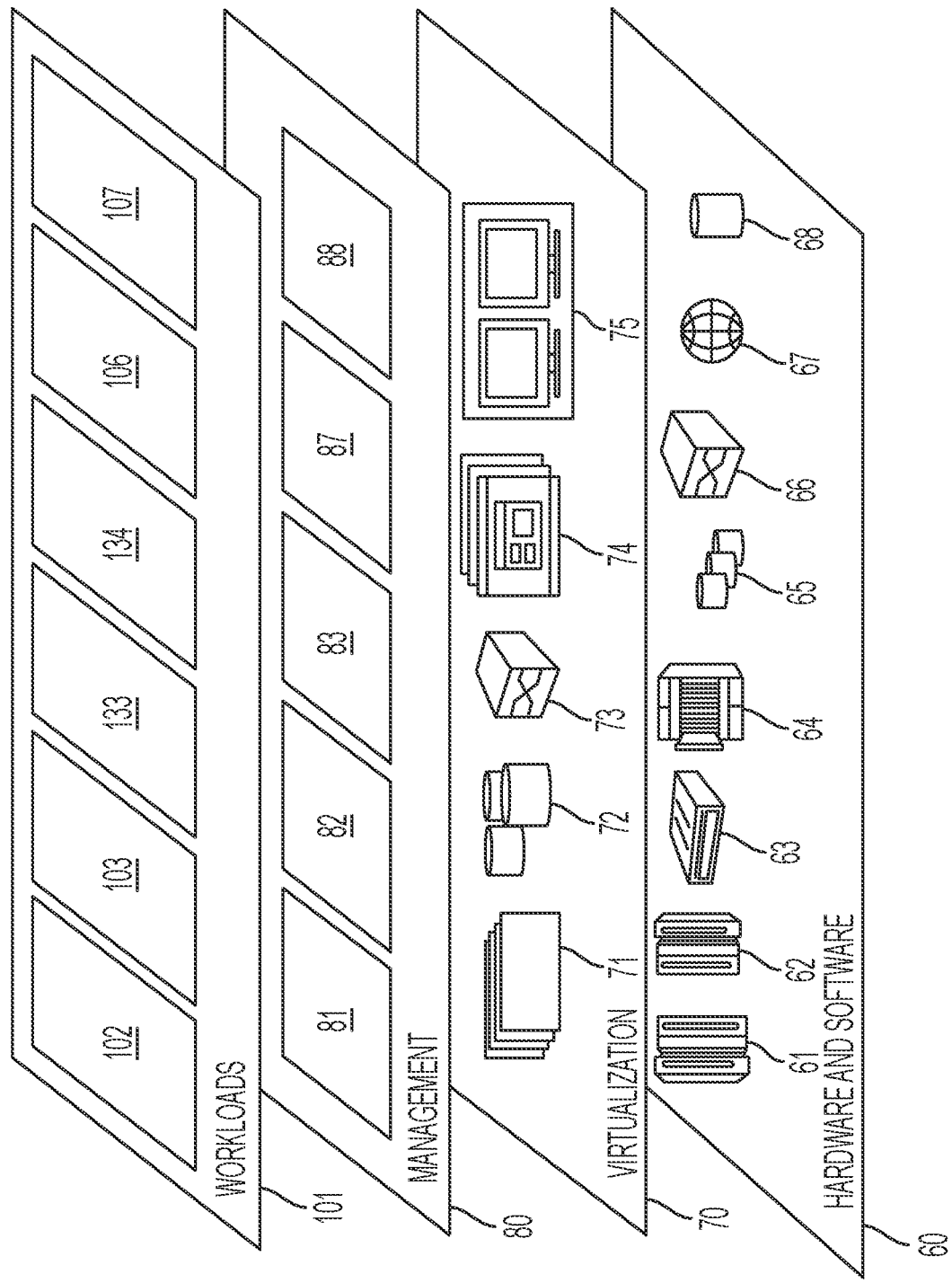
FIG. 8 illustrates a set of functional abstraction layers provided by cloud computing environment, in accordance with embodiments of the present invention.

Referring now to FIG. 8, a set of functional abstraction layers provided by cloud computing environment 50 (see FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 87 provides cloud computing resource allocation and management such that required service levels are met. Service Level Agreement (SLA) planning and fulfillment 88 provide pre-arrangement for, and procurement of, cloud computing resources for which a future requirement is anticipated in accordance with an SLA.

Workloads layer 101 provides examples of functionality for which the cloud computing environment may be utilized. Examples of workloads and functions which may be provided from this layer include: mapping and navigation 102; software development and lifecycle management 103; virtual classroom education delivery 133; data analytics processing 134; transaction processing 106; and for improving cryptographic and software technology associated with configuring and modifying a key template for installing instances of associated cryptographic keys within a keystore and generating an associated transformation structure for causing the associated cryptographic keys to be enabled and usable for applications on a target platform 107.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A hardware device comprising a processor, a computer-readable memory unit, and a cryptographic hardware or software unit, said processor coupled to the memory unit, said memory unit comprising instructions that when executed by the processor implements an encryption key management method, said method comprising:
   connecting, by said processor, said hardware device to at least one keystore agent, wherein said at least one keystore agent comprises a system configured to manage one or more keystores holding one or more cryptographic key instances;
   configuring, by said processor, a key template to define at least one attribute for generating cryptographic keys;
   configuring, by said processor, at least one target hardware system to receive said cryptographic keys;
   modifying, by said processor, said key template such that said one or more keystores and its associated controlling agent is added to said key template, wherein results of said modifying enable said at least one keystore agent to receive said cryptographic keys generated via processing of said key template, followed by installing said cryptographic keys in keystores defined by the key template;
   generating, by said processor from said key template, a plurality of instances of associated cryptographic keys;
   installing, by said processor, each instance of said plurality of instances within said one or more keystores through said associated controlling agent pre-defined by said key template to receive said associated cryptographic keys;
   generating, by said processor from said key template for each instance of said plurality of instances with respect to a key management software application, a transformation structure comprising a key value and associated attributes associated with data for consumption by said at least one keystore agent and associated managed keystores of said one or more keystores;
   enabling, by said processor, said at least one target hardware system such that said at least one target hardware system is operationally functional;
   generating, by said processor from said key template for each instance of said plurality of instances, a key event log defining all events associated with a given key of said associated cryptographic keys from creation to deletion of said given key; and
   maintaining, by said processor, a repository comprising key templates and associated key data generated by said key templates, wherein said repository comprises a backup repository configured to enable restoration functions associated with connected key stores.

2. The hardware device of claim 1, wherein said associated attributes are selected from the group consisting of a cryptographic algorithm, a specified naming convention, a key type, a key size, restrictions defining key generation with respect to single or multiple key generation means, and restrictions defining key export attributes associated with multiple key wrapping attributes.

3. The hardware device of claim 1, wherein said method further comprises:
   modifying, by said processor, at least one policy affecting at least one key attribute defined by said key template for generating said associated cryptographic keys; and
   automatically deploying, by said processor, modifications to said at least one policy with respect to at least one of said associated cryptographic keys previously generated by said key template and stored by said at least one keystore agent into a keystore configured to receive cryptographic keys generated using said key template.

4. The hardware device of claim 1, wherein said method further comprises;
   discovering and adding, by said processor executing said at least one key store agent, at least one existing key store or key vault;
   importing, by said processor, said at least one existing key store or key vault into an associated key management application for enabling availability with respect to inclusion within associated key templates;
   creating, by said processor and said at least one key store agent, at least one new key store or key vault; and
   registering, by said processor, said at least one new key store or key vault within said associated key management application for availability with respect to inclusion within said associated key templates.

5. An encryption key management method, said method comprising:
   connecting, by a processor of a hardware device comprising cryptographic hardware or software unit, said hardware device to at least one keystore agent, wherein said at least one keystore agent comprises a system configured to manage one or more keystores holding one or more cryptographic key instances;
   configuring, by said processor, a key template to define at least one attribute for generating cryptographic keys;
   configuring, by said processor, at least one target hardware system to receive said cryptographic keys;
   modifying, by said processor, said key template such that said one or more keystores and its associated controlling agent is added to said key template, wherein results of said modifying enable said at least one keystore agent to receive said cryptographic keys generated via processing of said key template, followed by installing said cryptographic keys in keystores defined by the key template;
   generating, by said processor from said key template, a plurality of instances of associated cryptographic keys;
   installing, by said processor, each instance of said plurality of instances within said one or more keystores through said associated controlling agent pre-defined by said key template to receive said associated cryptographic keys;
   generating, by said processor from said key template for each instance of said plurality of instances with respect to a key management software application, a transformation structure comprising a key value and associated attributes associated with data for consumption by said at least one keystore agent and associated managed keystores of said one or more keystores;
   enabling, by said processor, said at least one target hardware system such that said at least one target hardware system is operationally functional;
   generating, by said processor from said key template for each instance of said plurality of instances, a key event log defining all events associated with a given key of said associated cryptographic keys from creation to deletion of said given key; and maintaining, by said processor, a repository comprising key templates and associated key data generated by said key templates, wherein said repository comprises a backup repository configured to enable restoration functions associated with connected key stores.

6. The method of claim 5, wherein said associated attributes are selected from the group consisting of a cryptographic algorithm, a specified naming convention, a key type, a key size, restrictions defining key generation with respect to single or multiple key generation means, and restrictions defining key export attributes associated with multiple key wrapping attributes.

7. The method of claim 5, wherein said method further comprises:

modifying, by said processor, at least one policy setting affecting at least one key attribute defined by said key template for generating said associated cryptographic keys; and automatically deploying, by said processor, modifications to said at least one policy setting with respect to at least one of said associated cryptographic keys previously generated by said key template and stored into a keystore by said at least one keystore agent configured to receive cryptographic keys generated using said key template.

8. The method of claim 7, wherein said at least one policy setting comprises executable code for automatically restoring a cryptographic key of said associated cryptographic keys in response to said cryptographic key being missing metadata.

9. The method of claim 7, wherein said at least one policy setting comprises executable code for automatically restoring a cryptographic key of said associated cryptographic keys in response to said cryptographic key comprises comprising invalid or incorrect metadata.

10. The method of claim 5, wherein said method further comprises:

discovering and adding, by said processor executing said at least one key store agent, at least one existing key store or key vault;

importing, by said processor, said at least one existing key store or key vault into an associated key management application for enabling availability with respect to inclusion within associated key templates;

creating, by said processor and said at least one key store agent, at least one new key store or key vault; and registering, by said processor, said at least one new key store or key vault within said associated key management application for availability with respect to inclusion within said associated key templates.

11. The method of claim 5, further comprising:

configuring, by said processor, said key template with respect to multiple key instances, wherein each instance of said multiple key instances is defined to reside at a specific location within an overall key hierarchy comprising multiple hierarchies configured to support multiple functions.

12. The method of claim 11, wherein said multiple functions comprise functions selected from the group consisting of a hierarchy function retaining a backup of all keys belonging to a specific functional operation and a hierarchy function retaining all system keys grouped together such that a specified key comprising a unique key value is placed within multiple hierarchies wrapped with an underlying key within a given hierarchy.

13. The method of claim 5, further comprising:

enabling, by said processor, separation of duties functionality enforced during a login function executed with respect to access to sensitive operations or executing a key generation process with respect to said hardware device, wherein each key record generated from an associated key template comprises a key event log retaining information associated with a generated key from creation of said generated key to deletion of said generated key thereby covering an associated key lifecycle.

14. The method of claim 5, wherein at least one keystore component comprises a key store component enabled via said at least one keystore agent and a component selected from the group consisting of a hardware security component (HSM), an emulating software component (software emulated HSM), and a cloud based key store or key vault.

15. The method of claim 5, wherein said encryption key management method comprises a transparent process associated with differing entities and differing hardware and software based key wrapping processes and exchange protocols.

16. The method of claim 5, wherein said installing each instance of said plurality of instances comprises installing each instance within differing target systems via a single work process with respect to a hybrid environment comprising different cloud systems and on-premise systems enabling several systems to share a same key.

17. The method of claim 5, further comprising:

providing at least one support service for at least one of creating, integrating, hosting, maintaining, and deploying computer-readable code in the hardware device, said code being executed by the processor to implement: said connecting, said configuring said key template, said configuring said at least one target hardware system, said modifying, said generating said plurality of instances, said installing, said generating said transformation structure, said enabling, said generating said key event log, and said maintaining.

18. The method of claim 5, wherein said associated attributes comprise restrictions defining key export attributes associated with multiple key wrapping attributes.

19. The method of claim 5, wherein the key template includes a cryptographic algorithm, a key type, a key size, and restrictions associated with a means for key generation.

20. A computer program product, comprising a computer readable hardware storage device storing a computer readable program code, said computer readable program code comprising an algorithm that when executed by a processor of a hardware device comprising a cryptographic hardware or software unit implements an encryption key management method, said method comprising:

connecting, by said processor, said hardware device to at least one keystore agent, wherein said at least one keystore agent comprises a system configured to manage one or more keystores holding one or more cryptographic key instances;

configuring, by said processor, a key template to define at least one attribute for generating cryptographic keys;

configuring, by said processor, at least one target hardware system to receive said cryptographic keys;

modifying, by said processor, said key template such that said one or more keystores and its associated controlling agent is added to said key template, wherein results of said modifying enable said at least one keystore agent to receive said cryptographic keys generated via processing of said key template, followed by installing said cryptographic keys in keystores defined by the key template;

generating, by said processor from said key template, a plurality of instances of associated cryptographic keys;

installing, by said processor, each instance of said plurality of instances within said one or more keystores through said associated controlling agent pre-defined by said key template to receive said associated cryptographic keys;

generating, by said processor from said key template for each instance of said plurality of instances with respect to a key management software application, a transformation structure comprising a key value and associated attributes associated with data for consumption by said at least one keystore agent and associated managed keystores of said one or more keystores;

enabling, by said processor, said at least one target hardware system such that said at least one target hardware system is operationally functional;

generating, by said processor from said key template for each instance of said plurality of instances, a key event log defining all events associated with a given key of said associated cryptographic keys from creation to deletion of said given key; and maintaining, by said processor, a repository comprising key templates and associated key data generated by said key templates, wherein said repository comprises a backup repository configured to enable restoration functions associated with connected key stores.

* * * * *